United States Patent Office 3,644,564
Patented Feb. 22, 1972

3,644,564
ETHYLENE OLIGOMERIZATION IN THE PRESENCE OF COMPLEX NICKEL-FLUORINE-CONTAINING CATALYSTS
Henry van Zwet, Amsterdam, Netherlands, and Ronald S. Bauer, Orinda, and Wilhelm Keim, Berkeley, Calif., assignors to Shell Oil Company, New York, N.Y.
No Drawing. Filed Dec. 19, 1969, Ser. No. 886,789
Int. Cl. C07c 3/10
U.S. Cl. 260—683.15 D        15 Claims

ABSTRACT OF THE DISCLOSURE

Ethylene is oligomerized to a mixture of linear olefinic products in the presence of an organoaluminum-free catalyst which is the product of the reaction of a nickel compound which is an atom of nickel in complex with an olefinically unsaturated compound with a fluorine-containing ligand. The preferred nickel compound is bicyclooctadiene-1,5-nickel. The fluorine-containing ligands are selected from the group consisting of trifluoroacetic acid, 4,4,4-trifluoro-3-hydroxy-3-trifluoromethylbutyric acid, perfluoro-propene, hexafluoroacetylacetone and trifluoroacetylacetone.

A variety of oligomerization catalysts, both homogeneous and heterogeneous, has been utilized to convert, i.e. oligomerize, ethylene into olefinic products of higher molecular weight, e.g. dimer and trimer as well as higher olegomers and polymer. One homogeneous process is disclosed in U.S. Pat. 3,321,546, Roest et al. issued May 23, 1967. The process of this patent employs a catalyst prepared from a hydrocarbon-soluble nickel salt and an alkyl aluminum halide to oligomerize olefins to a product mixture comprising essentially linear olefinic products. The present invention provides an improved process for oligomerizing ethylene through the use of an organoaluminum-free catalyst which is the product of the reaction of a nickel compound, which is in an atom of nickel in complex with an olefinically unsaturated compound, with a fluorine-containing ligand selected from the group consisting of trifluoroacetic acid, 4,4,4-trifluoro-3-hydroxy-3-trifluoromethylbutyric acid, perfluoropropene, hexafluoroacetylacetone. The process is characterized by an ethylene conversion at moderate temperature to a product mixture of high proportions of olefinic products in higher molecular weight range, e.g. trimer, tetramer and higher oligomers, which are highly linear in character and predominantly alpha-olefins.

U.S. Pat. 3,361,777, King, issued Jan. 23,1968, describes certain 1,2-bis(trifluoromethyl) ethene- and cyclopentadienyl [1,2-bis(trifluoromethyl) ethene-1,2-dithiolato] metal chelates such as bis 1,2-bis (trifluoromethyl) ethene- and cyclopentadienyl [1,2-bis (trifluoromethyl) ethene-1,2-dithiolato] nickel, useful as antiknock additives for gasoline, as fingerprint developers and as oxidizing agents. The present invention relates to ethylene oligomerization processes utilizing catalysts which are the interaction products of nickel compounds and fluorine-containing ligands which products are not within the prior art teachings.

Durand et al., Polymer Letters, 6, pp. 757–761 (1968), describe the polymerization of 1,3-butadiene in the presence of monometallic catalytic complexes. The authors disclose three types of catalysts. Catalyst A is obtained by reacting in situ biscyclooctadiene-1,5-nickel (0), butadiene and trifluoroacetic acid, Catalyst B by replacing 1,5-cyclooocetadiene in the nickel (0)-containing moiety by 1,3-butadiene followed by adding trifluoroacetic acid, and Catalyst C by reacting trifluoroacetic acid with dodeca-2,6-10-triene-1,12-diyl-nickel. The process of the article produces high molecular weight polymers from 1,3-butadiene. The present invention is directed to the oligomerization of ethylene.

Browning et al., Chemical Communications, No. 16, (Aug. 21, 1968), disclose: (1) the reaction of bis(2-methylallyl) nickel with tetrafluoro-ethylene to form a tetrafluoro-ethylene complex characterized by a 4,4,5,5-tetrafluoro-2,7-dimethylocta-1,7-diene moiety; (2) the reaction of biscycloocta-1,5-diene nickel with hexafluoroacetone to produce a crystalline complex; (3) the reaction of the crystalline complex from (2) with various ligands to displace the cycloocta-1,5-diene moiety. The article does not teach any use for the reaction products.

U.S. Pat. 3,424,815, Cannell et al., issued Jan. 28, 1969, discloses the oligomerization of olefins to a mixture of principally olefin dimers and trimers in the presence of a homogeneous catalyst prepared from an organoaluminum compound and a salt of a divalent nickel and a halogenated chelating anion which can be trifluoroacetylacetone, or hexafluoroacetylacetone, and U.S. Pat. 3,431,318, McClure, issued Mar. 4, 1969, discloses the oligomerization of terminal olefins to a mixture consisting principally of linear olefin dimers and trimers in the presence of a homogeneous catalyst prepared from an alkali metal tetracoordinate organo-aluminate compound and a salt of divalent nickel and a halogenated chelating anion which again can be hexafluoroacetylacetone.

U.S. Pat. 3,468,866, Alferov et al., issued Sept. 23, 1969, describes a polymerization of butadiene under the catalytic effect of products obtained by reacting a π-allylic complex of a transition metal of Groups IV to VIII of the Periodic System with an organic electron acceptor which can be trifluoroacetic acid. The patent does not relate to ethylene oligomerization.

It has now been found that an improved process of oligomerizing ethylene is obtained through the use of the organoaluminum-free reaction product of a nickel compound, which is an atom of nickel in complex with an olefinically unsaturated compound, with a fluorine-containing ligand selected from the group consisting of trifluoroacetic acid, 4,4,4-trifluoro-3-hydroxy-3-trifluoromethylbutyric acid, perfluoropropene, hexafluoroacetylacetone and trifluoroacetylacetone. The present invention relates to such oligomerization processes and to such compositions which are the novel catalyst products of the reaction described. Where the subject of the present invention is the catalyst composition per se or process of making the catalyst composition then the fluorine-containing ligands are described as selected from the group consisting of 4,4,4-trifluoro-3-hydroxy-3-trifluoromethylbutyric acid, perfluoropropene, hexafluoroacetylacetone and trifluoroacetylacetone. On the other hand, when the catalyst composition is produced in the presence of ethylene, the fluorine-containing ligand can also trifluoroacetic acid.

The nickel compound employed as a catalyst for the oligomerization process may be described as comprising an atom of nickel from a biscyclooctadiene nickel (0) complex or like complex of nickel (0) or nickel (I) further complexed with a fluorine-containing ligand selected from the group consisting of trifluoroacetic acid, 4,4,4-trifluoro-3-hydroxy-3-trimethylbutyric acid, perfluoropropene, hexafluoroacetylacetone and trifluoroacetylacetone. This description is suitable for describing the catalyst of the present invention but is not preferred for the reasons infra. Although it is not desired to be bound by any particular theory, it appears likely that the catalyst molecule undergoes chemical transformations during the course of the polymerization reaction possibly involving coordination and/or bonding of ethylene to the nickel moiety. However, it appears likely that the fluorine-containing ligand remains complexed and/or chemically bonded to the nickel moiety during the course of the reaction and that this complex of nickel and fluorine-containing ligand is the effective catalytic species of the polymerization process. In any event, the ligand is an essential component of the catalyst and, provided the nickel catalyst contains the required fluorine-containing ligand, the nickel catalyst may be complexed with a variety of additional organic complexing ligands.

The catalysts of the present invention are typically formed in situ in the reaction medium but the present invention encompasses the nickel catalysts as described regardless of what sequence is used for catalyst preparation and polymerization. Whether the catalyst is formed and perhaps even identified prior to its use as a polymerization catalyst or is formed in the reaction medium while the polymerization is proceeding, its exact form during the polymerization reaction is not precisely ascertainable. For this reason, the catalyst is preferably described as the organoaluminum-free product of the reaction of the nickel compound with the fluorine-containing ligand as described.

When the catalyst is characterized as the product of the reaction of a nickel compound with the acid wherein the nickel compound is selected from the group consisting of nickel (0) compositions and nickel (I) compositions, the characterization does not encompass nickel which is reducible to a lower positive valence state. In the case of the Ni (I) compositions, the nickel is capable of being reduced to a lower (non-positive) valence state which is zero (0). The nickel (0) compositions comprise an atom of nickel complexed or chemically bonded to sufficient chelating or complexing ligands to satisfy the coordination number of the nickel atom which typically but not invariably is four. However, because of the difficulty in ascribing oxidation states or valences to transition metal-containing catalysts, the catalysts of the present invention are preferably defined in terms of reaction products as abave or in terms of an empirical representation as described below rather than in precise bonding or oxidation state terms. Thus, the catalysts of this invention can be rpresented by the Formula I:

(I) $\quad L_n Ni(A)_m$ wherein L is an olefinically unsaturated compound of from 2 to 20 carbon atoms preferably of up to 4 olefinic linkages and of up to 3 carbocyclic rings; $m$ and $n$ are selected from numbers of from 1 to 3, the sum of $n$ and $m$ may be, but is not necessarily, equal to 4; and A is selected from the group consisting of trifluoroacetic acid, 4,4,4-trifluoro-3-hydroxy-3-trifluoromethylbuytric acid, perfluoropropene, hexafluoroacetylacetone and trifluoroacetylacetone. However, as pointed out above, it is preferred to describe the catalyst as the reaction product of the nickel compound and the fluorine-containing ligand and it is to be understood that the nickel catalyst as depicted in Formula I is meant only to represent the empirical composition of the nickel catalyst and that the precise nature of the bonding between the fluorine-containing ligand and the nickel moiety is not definitely known. However, it is considered likely that the nickel is in a low valence state, i.e. zerovalent or mono-valent nickel which valence state is dependent on the nature of the chemical bonding between the nickel moiety and the ligand.

A partciularly preferred class of olefinically unsaturated compounds for L are olefins of from 2 to 12 carbon atoms, represented by the Formula II:

(II) 

wherein R′ and R″ independently are hydrogen, alkyl, cycloalkyl, alkenyl, cycloalkenyl, aralkyl, aryl or alkaryl of up to 8 carbon atoms, with the proviso that the R′ and R″ groups may together form a divalent aliphatic moiety of from 2 to 10 carbon atoms and of up to three additional olefinic double bonds as the sole carbon-carbon unsaturation.

Illustrative olefins of Formula II therefore include ethylene, propylene, 2-butene, 1-pentene, 1-hexene, 1-octene, 1-decene, butadiene, isoprene, 1,3,5-octatriene, 1,3,7-octatriene, cyclopentene, cycloheptene, cyclopentadiene, cyclohexa-1,3-diene, cycloocta-1,5-diene, cyclooctatriene, cyclootatetraene and cyclododecatriene.

The particularly preferred organic complexing ligand L for this invention is cyclooctadiene. This moiety is unique and gives particularly good results in the polymerization of ethylene as will be shown later. The cyclooctadiene, in bonding terms, is π bonded to the nickel as opposed to the sigma bonding between nickel and for instance cyclopentadienyl chelates or at least is bonded to the nickel in a manner different than the chelate bonding between cyclopentadiene and nickel.

The nickel composition employed in the polymerization process is prepared by a variety of methods. In a preferred method, the catalyst composition is prepared by contacting an olefinic-nickel compound and the fluorine-containing ligand. The preferred class of olefinic nickel compounds useful as catalyst precursors are zero-valent nickel compounds represented by the Formula III:

(III) 

wherein R′CH=CHR″ has the significance as defined in Formula II. Illustrative nickel compounds of Formula III are therefore bis(cyclooctadiene) nickel (0), bis(cyclooctatetraene) nickel (0), and bis(1,3,7-octatriene) nickel (0).

Another class of olefinic nickel compounds useful as catalyst precursors is π-allyl nickel compounds wherein the nickel moiety is bonded to a π-allylic moiety characterized by delocalization of the electronic contribution of the π-allyl moiety among three contiguous carbon atoms. One suitable type of π-allyl nickel compounds is represented by the Formula IV:

(IV) 

wherein R′ and R″ independently are hydrogen, alkyl, cycloalkyl, alkenyl, cycloalkenyl, aralkyl, aryl or alkaryl of up to 8 carbon atoms, Y is halogen, preferably halogen of atomic number from 17 to 35 inclusive, i.e. chlorine or bromine, alkoxy or alkanoyloxy of up to 10 carbon atoms, and the dotted line designation represents the electronic delocalization among the three illustrated contiguous carbon atoms, with the proviso that R″ together with one R′ may form a divalent alkylene moiety of 2 to 10 carbon atoms, preferably 2 to 5, and up to 3 additional olefinic double bonds. When considered as a whole, preferred π-allyl moieties have from 3 to 12 carbon atoms and are otherwise free from aliphatic unsaturation unless the π-allyl moiety is part of a closed ring system.

Illustrative of suitable π-allyl nickel halides of the above Formula IV are π-allylnickel chloride, π-allylnickel bromide, π-crotylnickel chloride, π-methylallylnickel chloride, π-ethylallylnickel chloride, π-cyclopentenylnickel chloride, π-cinnamylnickel bromide, π-phenylallylnickel chloride, π-cyclohexenylnickel bromide, π-cyclododecenylnickel chloride and π-cyclododecatrienylnickel chloride. Although the complex of the above Formula IV and other π-allyl nickel halides probably exist independently in the form of a dimer, for convenience and simplicity the π-allyl nickel halides are herein depicted and named as monomeric species.

Other suitable π-allyl nickel compounds of Formula V are π-allylnickel acetate, π-methylallylnickel propionate, π-cyclooctanylnickel octoate, π-allylnickel methoxylate and π-allylnickel ethoxyate.

Other suitable types of π-allyl nickel compounds useful as catalyst precursors are bis-π-allyl nickel compounds represented by the Formula V:

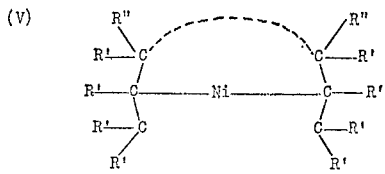

wherein R'', R' and the dotted line designation have the same significance as defined in Formula IV with the proviso that R'' together with one R' of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closed ring system. Illustrative of suitable bis-π-allyl nickel compounds of the above Formula V are bis-π-allyl nickel, bis-π-methallyl nickel, bis-π-cinnamyl nickel, bis-π-octadienyl nickel, bis-π-cyclohexenyl nickel, π-allyl-π-methallyl nickel, and bis-π-cyclooctatrienyl nickel.

The olefinic-nickel catalyst compound and the fluorine-containing ligand are contacted in a molar ratio of nickel compound to fluorine ligand of between 0.5:1 to 1:12 with a preferred range of 1:1 to 1:4. The catalyst composition is suitably preformed by contacting the caftalyst precursors in an inert diluent, e.g. diluents employed for the polymerization process. In another modification, however, the catalyst precursor components are contacted in the presence of the ethylene reactant during the initiation of the polymerization process. By any modification, the precursor components are contacted at temperatures from 25° to 100° C.

The nickel catalyst is suitably employed as an unsupported material. In certain modifications, the nickel catalyst can be supported on an inorganic, solid catalyst carrier which is normally solid under reaction conditions and is heterogeneous, i.e. is substantially insoluble in the reaction medium. Illustrative of suitable inorganic, solid catalyst carriers are inorganic acidic oxide such as alumina and inorganic materials known as refractory oxides. Suitable refractory oxides include synthetic components as well as acid treated clays and similar materials such as kieselguhr or crystalline macroreticular aluminosilicates known in the art as molecular sieves. In general, synthetic catalyst carriers are preferred over natural occurring materials or molecular sieves. Exemplary synthetic catalyst carriers include alumina, silica-alumina, silica-magnesia, silica-alumina-titania, silica-alumina-zirconia, silica-titania-zirconia, silica-magnesia-alumina and the like, Particularly preferred catalyst carriers are siliceous refractory oxides containing up to 90% by weight of alumina, especially silica and silica-alumina.

When the catalyst composition is supported, the proportion of catalyst composition to carrier is not critical. In general, proportions of catalyst composition from 0.01% to 70% by weight, based on the catalyst carrier are satisfactory, with amounts of from 0.1% to 20% by weight, calculated on the same basis, being preferred. The catalyst composition is introduced onto the carrier in any suitable manner. In one modification, the supported catalyst composition is prepared by intimately contacting the pre-formed catalyst composition and the carrier in an inert diluent, preferably the same inert diluent employed for preparing the catalyst composition. In another modification, the catalyst composition can be prepared directly on the catalyst carrier support surface by contacting the catalyst composition precursors in the presence of the catalyst carrier in a suitable inert diluent.

The amount of catalyst composition employed in the oligomerization process is not critical. In general, amounts of catalyst composition from 0.001% by weight to 100% by weight based on ethylene are satisfactory with amounts from 0.01% by weight to 25% by weight on the same basis being preferred. The ethylene is contacted with the catalyst composition on the catalyst precursor components in the liquid phase in the absence or presence of reaction solvent or diluent which is liquid at reaction temperature and pressure. Illustrative suitable diluents and solvents are aromatic compounds such as benzene, toluene, chlorobenzene and oxygenated hydrocarbons such as dialkyl ketones, e.g. acetone, methyl ethyl ketone and ethyl butyl ketone; cycloalkyl ethers, e.g. dioxane, tetrahydrofuran and tetrahydropyran and acyclic alkyl ethers, e.g. dimethoxyethane, diethylene glycol dimethyl ether and dibutyl ether. Other suitable solvents or diluents include nitriles suc has acetonitrile and propionitrile; dialkylamides such as dimethylformamide; and dialkylsulfoxides such as dimethylsulfoxide. Still other suitable solvents or diluents comprise water or water containing a portion of a polar organic co-solvent. Suitable mixtures of water and a polar organic co-solvent vary, by volume, from about 40% co-solvent to 80% co-solvent and from about 20% water to 80%. Alkanes and alkenes, including cycloalkanes and cycloalkenes, of from 5 to 20 carbon atoms such as butene-1, isopentane, pentene, cyclopentane, cyclohexane, isohexane, heptane, isooctane, decane, decene-1, dodecane, hexadecene and eicosane are also suitable reaction solvents. In some modifications of the polymerization process, a portion of the product suitably serves as reaction diluent and no added diluent is employed. When diluent is utilized, however, amounts up to about 30 moles of diluent per mole of ethylene are satisfactory. Preferred reaction diluents and solvents are aromatic hydrocarbons, lower dialkylsulfoxides, lower alkyl nitriles, alkanes, or mixtures thereof.

The process is suitable conducted in an inert reaction environment so that the presence of reactive materials such as oxygen is desirably avoided. Reaction conditions are therefore substantially oxygen-free.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperatures and pressure for the desired reaction period. Another modification comprises passing, in a continuous manner, the ethylene reactant in liquid phase solution in the reaction diluent through a reaction zone in which a supported catalyst composition is maintained. By any modification, the polymerization process is conducted at moderate temperatures and pressures. Suitable reaction temperatures vary from about 25° C. to 250° C., but preferably from 30° C. to 80° C. The reaction is conducted at or above atmospheric pressure. The precise pressure is not critical, so long as the reaction mixture is maintained substantially in a non-gaseous phase. Typical pressures vary from 10 p.s.i.g. to 5000 p.s.i.g. with the range from 100 p.s.i.g. to 1,000 p.s.i.g.

The oligomer products are separated and recovered from the reaction mixture by conventional methods such as fractional distillation, selective extraction, adsorption and the like. The reaction diluent, catalyst and any unreacted ethylene are recycled for further utilization.

During the oligomerization process, ethylene is converted to dimer, trimer, tetramer, and like higher oligomers with polymers, i.e. polyethylene, being observed on certain occasions. The product mixture is characterized by a high proportion of linear, terminal oligomer products.

The ethylene oligomer products are materials of established utility and many are chemicals of commerce. The products are converted by conventional "Oxo" processes to aldehydes which are hydrogenated with conventional "Oxo" processes to aldehydes which are hydrogenated with conventional catalysts to the corresponding alcohols. Alternatively, the product olefins are converted to secondary alcohols by sulfuric acid-catalyzed hydration. The $C_{12}$–$C_{20}$ alcohols thereby produced are ethoxylated as by reaction with ethylene oxide in the presence of a basic catalyst, e.g. sodium hydroxide, to form conventional detergents and the lower molecular weight alcohols are esterified by reaction with polybasic acids, e.g. phthalic acid, to form plasticizers for polyvinyl chloride.

To further illustrate the improved process of the invention and the novel catalyst composition therefore, the following examples are provided:

EXAMPLES I AND II

To a solution of 0.244 g. of biscyclooctadiene-1,5-nickel (0) and 20 ml. of toluene was added 0.114 g. of trifluoroacetic acid. The reaction mixture was charged into a 80 ml. autoclave, and ethylene monomer was charged to an initial pressure of 500 p.s.i. The oligomerization reaction was carried out at room temperature for 10 hours.

The autoclave was opened, the polymeric material filtered off, and the liquid phase analyzed. The yield was 0.825 g. of polymer and 4.88 g. of oligomer with a product distribution as given in table, column I.

A second similar run was conducted as above and is reported in the table, column II.

EXAMPLES III AND IV

A supported catalyst was prepared by admixing 0.244 g. of biscyclooctadiene-1,5-nickel (0), 0.114 g. of trifluoroacetic acid and 1 g. of a silica-alumina support. The reaction mixture was charged into an 80 ml. autoclave and ethylene monomer was charged to an initial pressure of 500 p.s.i. The reaction was carried out at room temperature for 15 minutes. The results of this run are reported in column III of the table.

Another run using $Al_2O_3$ as the support was conducted as above and is reported in column IV.

EXAMPLE V

A catalyst which was the reaction product of biscyclooctadiene-1,5-nickel (0) with hexafluoroacetylacetone was charged in amount of 0.400 g. in 5 ml. of benzene to an 80 ml. autoclave. Ethylene monomer was added to an initial pressure of 250 p.s.i. The reaction was carried out at 70° C. for 4 hours with the results as reported in column V on the table.

EXAMPLE VI

A catalyst which was the reaction product of biscyclooctadiene-1,5-nickel (0) with trifluoroacetylacetone was charged in amount of 0.151 g. in 5 ml. of toluene to an 80 ml. autoclave. Ethylene monomer was added to an initial pressure of 750 p.s.i. The reaction was carried out at 70–80° C. for 2.5 hours with the results as reported in column VI of the table.

EXAMPLE VII

A catalyst solution which was the reaction product of 0.42 g. biscyclooctadiene-1,5-nickel (0) and 4,4,4-trifluoro-3-hydroxy-3-(trifluoromethyl) butyric acid in 30 ml. of toluene was charged into a stainless steel autoclave. Ethylene monomer was added to an initial pressure of 1000 p.s.i. The reaction was carried out at 40° C. for 2 hours. There was obtained 30.3 g. of product as shown in column VII of the table.

EXAMPLE VIII

A catalyst solution prepared by bubbling 5.33 g. of hexafluoropropene through a solution of 0.375 g. biscyclooctadiene-1,5- nickel (0) at 0° C. was charged into an 80 ml. stainless steel autoclave. After pressuring with ethylene to 900 p.s.i. the reaction temperature slowly rose from ambient to 30° C. over a period of 2 hours. The temperature then suddenly increased to 124° C. After an additional 2 hours, the reactor had cooled back to 34° C. About 15 g. of oligomers consisting mainly of $C_4$ through $C_{10}$ components and a trace of polymer were attained.

TABLE

| | I | II | III | IV | V | VI | VII |
|---|---|---|---|---|---|---|---|
| Support | None | None | (1) | $Al_2O_3$ | None | None | None |
| Products (percent): | | | | | | | |
| $C_4$ | 11.2 | 24.6 | 54.7 | 25.1 | 14 | 28 | 30.1 |
| $C_6$ | 22.5 | 19.1 | 36.4 | 26.5 | 20 | 24 | 24.7 |
| $C_8$ | 10.2 | 15.5 | 6.4 | 16.9 | 29 | 20 | 16.7 |
| $C_{10}$ | 11.7 | 9.9 | 2.5 | 14.5 | 19 | 15 | 11.7 |
| $C_{12}$ | 8.8 | 7.5 | | 7.6 | 11 | 8 | 7.0 |
| $C_{14}$ | 5.4 | 4.6 | | 4.3 | 7 | 5 | 4.3 |
| $C_{16}$ | 4.3 | 3.6 | | | | | 5.2 |
| $C_{18}$ | 2.2 | 1.9 | | 2.6 | | | 1.5 |
| $C_{20}$ | | | | 1.4 | | | 0.8 |
| Oligomer (weight grams) | 4.8 | | 30 | 1.1 | 13.2 | 2 | 20.3 |
| Polymer (weight grams) | 0.825 | | | | 1.2 | | |
| Activity¹ (grams oligomer/grams of catalyst x hours) | 1.7 | 32 | >700 | 1.7 | 8.1 | 5.1 | 330 |
| Linearity of oligomers (percent) | >90 | >95 | 90 | >95 | 61 | >60 | >90 |

¹ Silica alumina.

We claim as our invention:

1. A process of oligomerizing ethylene by contact in an inert liquid diluent at a temperature of about 25° C. to 250° C. in the presence of a catalyst which is the product of the reaction of a nickel compound comprising an atom of nickel in complex with an olefinically unsaturated compound with a fluorine-containing ligand selected from the group consisting of perfluoropropene, hexafluoroacetylacetone and trifluoroacetylacetone.

2. The process of claim 1 wherein said catalyst is represented by the formula:

$$L_nNi(A)_m$$

wherein L is an olefinically unsaturated compound of from 2 to 20 carbon atoms, of up to 4 olefinic linkages and of up to 3 carbocyclic rings; $m$ and $n$ are selected from numbers of from 1 to 3; and A is selected from the fluorine-containing ligands of claim 1.

3. The process of claim 1 wherein said nickel compound is selected from the group consisting of nickel (0) compositions and nickel (I) compositions.

4. The process of claim 1 wherein said nickel complex is represented by a formula selected from the group consisting of:

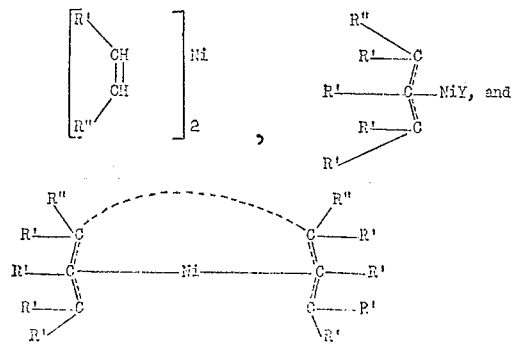

wherein R″ and R′ independently are hydrogen, alkyl, cycloalkyl, alkenyl, cycloalkenyl, aralkyl, aryl or alkaryl of up to 8 carbon atoms, and Y is halogen of atomic number 17 to 53 inclusive, alkoxy or alkanoyloxy of up to 10 carbon atoms, with the proviso that R″ together with one R′ may form a divalent alkylene moiety of 2 to 10 carbon atoms and of up to three additional olefinic double bonds.

5. The process of claim 1 in which said nickel compound is reacted with said ligand in a molar ratio of nickel compound to fluorine-containing ligand of from 0.5:1 to 1:12.

6. The process of claim 1 in which said nickel compound is reacted with said ligand in a molar ratio of nickel compound to ligand of from 1:1 to 1:4.

7. The process of claim 1 in which said nickel compound is reacted with said ligand at a temperature of from 25° C. to 100° C.

8. The process of claim 1 in which said catalyst is supported on an inorganic solid carrier.

9. The process of claim 8 in which said carrier is a siliceous refractory oxide.

10. The process of claim 1 in which the said catalyst is employed in an amount from 0.001% by weight to 100% by weight based on the ethylene.

11. The process of claim 10 in which said catalyst is employed in an amount of from 0.01% by weight to 25% by weight based on the ethylene.

12. The process of claim 1 in which said oligomerization process is carried out at a temperature of 30° C. to 80° C.

13. The process of claim 1 wherein said oligomerization process is carried out at a pressure from 10 p.s.i.g. to 5000 p.s.i.g.

14. The process of claim 13 wherein said oligomerization process is carried out at a pressure from 100 p.s.i.g. to 1000 p.s.i.g.

15. The process of claim 1 wherein said nickel compound is biscyclooctadiene-1,5-nickel (0).

References Cited

UNITED STATES PATENTS

| | | | |
|---|---|---|---|
| 3,379,706 | 4/1968 | Wilke | 260—683.15 X |
| 3,497,488 | 2/1970 | Dawans et al. | 260—94.3 |
| 3,483,269 | 12/1969 | Magoon et al. | 260—683.15 |
| 3,532,765 | 10/1970 | Barnett et al. | 260—683.15 |
| 3,536,778 | 10/1970 | Bergem et al. | 260—683.15 |
| 3,542,695 | 11/1970 | Dawans et al. | 252—431 |

PAUL M. COUGHLAN, Jr., Primary Examiner

U.S. Cl. X.R.

252—430; 260—94.9 B, 439 R